July 2, 1957 P. VAN TILBURG 2,798,118

SYSTEM FOR PULSE-CODE MODULATION

Filed June 13, 1951 3 Sheets-Sheet 1

INVENTOR

PIET VAN TILBURG

BY

AGENT

SYSTEM FOR PULSE-CODE MODULATION

Filed June 13, 1951 3 Sheets-Sheet 2

INVENTOR

PIET VAN TILBURG

BY [signature]

AGENT

INVENTOR
PIET VAN TILBURG
BY Fred M Vogel
AGENT

United States Patent Office 2,798,118

Patented July 2, 1957

2,798,118

SYSTEM FOR PULSE-CODE MODULATION

Piet van Tilburg, Eindhoven, Netherlands, assignor, by mesne assignments, to North American Philips Company, Inc., New York, N. Y., a corporation of Delaware Application June 13, 1951, Serial No. 231,306

Claims priority, application Netherlands June 27, 1950

8 Claims. (Cl. 179—15)

This invention relates to a system, and to transmitters and receivers to be used therein, for transmission of signals by pulse-code modulation, wherein each signal cycle comprises a synchronization interval in which synchronization pulses are emitted and several signal intervals, occurring in a cyclic order, within which signal pulses are present and absent in an alternation depending on the signals to be transmitted, in which all the pulses transmitted are identical and are coincident with different pulses from a series of equidistant pulses, and at the receiver end, the synchronization pulses are selected by the use of a synchronization pulse selector and control the receiver synchronization.

Characteristic of pulse-code modulation is the combined use of quantising in time and amplitude.

The use of time quantising ensures that from the pulse-code modulator are derived only pulses which are coincident with pulses from a series of equidistant pulses. This permits transmission errors introduced at the receiver end by time shifts of the received pulses to be substantially eliminated by the use of pulse regenerators which may be preceded by amplitude threshold and amplitude limiting devices. Especially in the transmission of signals via several relay transmitters this is a great advantage which is not afforded by other kinds of pulse modulation, such, for example, as pulse position modulation. Time quantisation may also be used to minimize cross-talk between various channels in the case of transmission of a plurality of signals with the use of time multiplex.

Whereas other customary modulation methods permit any instantaneous value of the signal ranging between certain limits to be transmitted, the use of amplitude quantisation permits of transmitting only a restricted number of amplitude levels. Thus, it has previously been suggested to use radio transmitters for transmission of intelligence signals by pulse-code modulation with the use of, for example, a binary five-unit code by which 32 different amplitude levels can be transmitted, the transmitted signal being scanned at the repetition frequency (signal cycle frequency) which is about double the highest signal frequency to be transmitted and is, for example, 8 kc./s. at a maximum signal frequency of 3.4 kc./s. Instead of the instantaneous values of the signal which occur at the scanning instants, one of the 32 transferable amplitude levels which most closely approximates this instantaneous value is each time transmitted in a particular manner, the level to be transmitted being coded in a code-pulse group modulator. In the use of a five-unit code a code-pulse group characteristic of this level and comprising a maximum of five identical, equidistant pulses is produced and transmitted, each of the signal pulses occurring within a signal interval individually assigned thereto. The presence or absence of one or more pulses of a code-pulse group is characteristic of the amplitude level and thus approximately of the instantaneous value of the signal.

In order to ensure synchronization of a receiver cooperating with such a transmitter it is known to transmit a synchronization pulse every second signal cycle and to suppress it in interposed signal cycles in such manner that all the transmitted pulses are identical and are coincident with different pulses from a series of equidistant pulses; each signal cycle comprising a single synchronization interval and several signal intervals occurring in cyclic order. Each of the said signal cycles comprises a number of signal intervals equal to the maximum number of signal pulses to be transmitted per signal cycle, that is to say, in the case of transmission of a single intelligence signal by the use of a five-unit code, 5 signal intervals and in the case of simultaneous transmission of $n$ intelligence signals in time multiplex, each with the use of a fiive-unit code, $5n$ signal intervals and so forth.

At a cycle frequency of, for example, 8 kc./s., the repetition frequency of the transmitted synchronization pulses is 4 kc./s. (since these pulses occur in alternate signal cycles). This has been found to be useful in practice since the signal intervals have generally only little energy content at this frequency. At the receiver end the synchronization intervals can be recognized, and hence found, by the occurrence therein of the said strong 4 kc./s. component which subsequent to the finding of the synchronization interval at the receiver end is used for controlling the receiver synchronization. However, a distinguishing signal of the synchronization intervals which in practice is sufficiently reliable in relation to signal intervals is not constituted by the said 4 kc./s. component.

Apart from the above-mentioned kind of transmitters for pulse-code modulation, transmitters based on similar principles have previously been suggested. They comprise pulse-code modulators in which the signals to be transmitted control a pulse modulator connected to a generator of equidistant pulses, a return circuit comprising a pulse-code demodulator, the return circuit including in sequence the series combination of a signal-frequencies integrating network and a difference producer, also controlled by the signals to be transmitted, shunting the pulse modulator. Set up across the difference producer is a return voltage which constitutes a quantum approximation to the signal to be transmitted and, depicted in a time diagram, winds about the input signal. Set up in the output circuit of the difference producer is, according as the instantaneous value of the return voltage is higher or lower than the instantaneous value of the signal to be transmitted, a positive or negative difference voltage. In accordance with the polarity of this difference voltage or a voltage derived therefrom the pulses supplied from the pulse generator are transmitted by the pulse modulator to the output circuit of the pulse-code modulator or are suppressed. Note U. S. Patent No. 2,662,118, issued December 8, 1953, and U. S. Patent No. 2,745,063, issued May 8, 1956. With the simultaneous transmission of a plurality of signals in a time-multiplex system in the manner as outlined, a synchronization pulse can be transmitted every second signal cycle to ensure synchronization of the receiver.

As an alternative, the said pulse-code modulators having a return circuit may be designed such (note U. S. Patent No. 2,662,113, issued December 8, 1953) that a binary pulse group code is used to reproduce the quantised instantaneous value of the difference voltage or a voltage deduced therefrom (note the U. S. Patent No. 2,745,063, issued May 8, 1956). In the use of this kind of pulse-code modulators having a return circuit, synchronization pulses are required to be emitted not only in the case of time-multiplex transmission but also in the case of transmission of even a single intelligence signal.

With pulse-code modulators having a return circuit the above-mentioned manner of transmitting synchronization pulses can also lead to practical difficulties. Thus, for example, with pulse-code modulators having a return circuit for transmission of signals with the use of a one-unit code, half the signal cycle frequency would be strongly represented in the pulse series emitted in corresponding signal intervals, in the absence of an intelligence signal and hence, for example, in a speech interval. The receiver synchronization would be able to respond thereto as if this intelligence channel were a synchronization channel.

The object of the present invention is inter alia: (*a*) improvement in systems of the type described and transmitters and receivers for use therein so as to limit the probability of synchronization disturbances due to the occurrence of abnormal working conditions in the signal channels of the transmitter; (*b*) to enable the synchronization interval at the receiver end to be quickly located; (*c*) to characterize the synchronization intervals in such manner that in the individual signal intervals and, if any, in the signal channels, signalizing pulses can be transmitted without the probability that a disturbance in the finding of the synchronization intervals as required at the receiver end and/or disturbance of the receiver synchronization may occur; (*d*) to prevent limitation of the maximum modulation frequency transmitted in the system to, say, 0.8 of the maximum pulse repetition frequency occurring because of increasing difficulties in locating the synchronization intervals or in interference with the receiver synchronization.

According to the invention, the duration of the synchronization intervals corresponds to two signal intervals and in each signal cycle a synchronization pulse is emitted only in a given half of the synchronization interval, preferably the latter half, whereas at the receiver end pulses corresponding to the received pulses and having a duration equal to the signal intervals are fed to the synchronization pulse selector via a differentiating network.

In order that the invention may be clearly understood and readily carried into effect, it will now be described more fully with reference to the accompanying drawings, in which.

Figure 1:
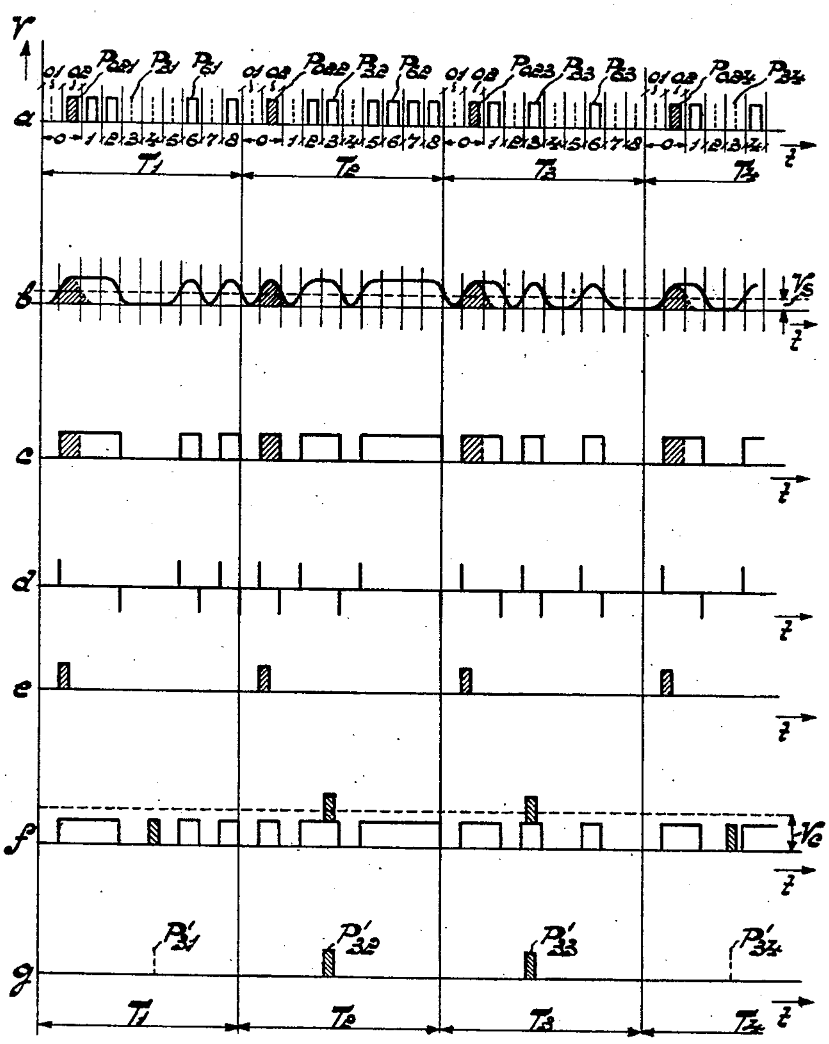
Fig. 1 shows a time diagram of pulses emitted by a 8+2 channels time-multiplex transmitter according to the invention for transmission of signals with the use of a one-unit code, and otherwise time diagrams of the said pulses subsequent to reception and incorporation of these pulses in a receiver according to the invention.

Referring to the diagram of Fig. 1*a*, $T_1$, $T_2$, $T_3$ and $T_4$ represent successive signal cycles each comprising ten intervals of equal size. The first and second intervals 01 and 02, respectively, form together the synchronization interval designated 0, in the last half 02 of which shaded synchronization pulses $P_{01}$, $P_{02}$, $P_{03}$, $P_{04}$ and so forth occur. The other intervals in each signal cycle are numbered consecutively from 1 to 8 and are intended for pulses associated with 8 different signal channels. In Fig. 1, $P_{31}$, $P_{32}$, $P_{33}$ and $P_{34}$ designate four pulses associated with the third signal channel, and it may be noted that the pulses $P_{31}$ and $P_{34}$ are suppressed and accordingly are designated by a broken line only. Pulses $P_{61}$, $P_{62}$, and $P_{63}$ associated with the sixth signal channel are indicated in a similar manner. They are always available in the three signal cycles $T_1$ to $T_3$.

There is no difference between the signal pulses and synchronization pulses as far as their form, duration and amplitude are concerned. The synchronization pulses occurring in the intervals 02 are recognizable by their continuous presence and by the absence of a pulse in the immediately preceding interval 01. Pulses associated with a definite signal channel, for example, the pulses $P_{31}$ to $P_{34}$ or $P_{61}$ to $P_{63}$ associated with the third or sixth signal channel are absent and present in an alternation depending on the signal to be transmitted in the channel in question. The essentially continuous presence or absence of the signal pulse in the signal interval associated with one of the signal channels represents an abnormal working condition. The probability that in a definite signal interval the signal pulses may be continuously absent and the signal pulses may be continuously present in an immediately following signal interval is very low; only in the event of occurrence of this most improbable working condition in two successive signal channels synchronization may be faulty at the receiver end. This, to a marked extent, ensures correct operation of the synchronization. The preceding considerations also apply in the first half (01) of the synchronization interval a synchronization pulse is emitted continuously and in the second half no pulse is emitted. However, in view of the receiver synchronization, the first-mentioned system is preferable.

In the pulse train shown in Fig. 1*a* all the emitted pulses are coincident with pulses from a train of equidistant pulses. The repetition frequency of the synchronization pulses and also the signal cycle frequency may be, for example, 50 kc./sec. and the duration of the transmitted pulses may be 1 $\mu$ sec., the maximum repetition frequency of the transmitted pulses being consequently 500 kc./sec.

Figure 2:
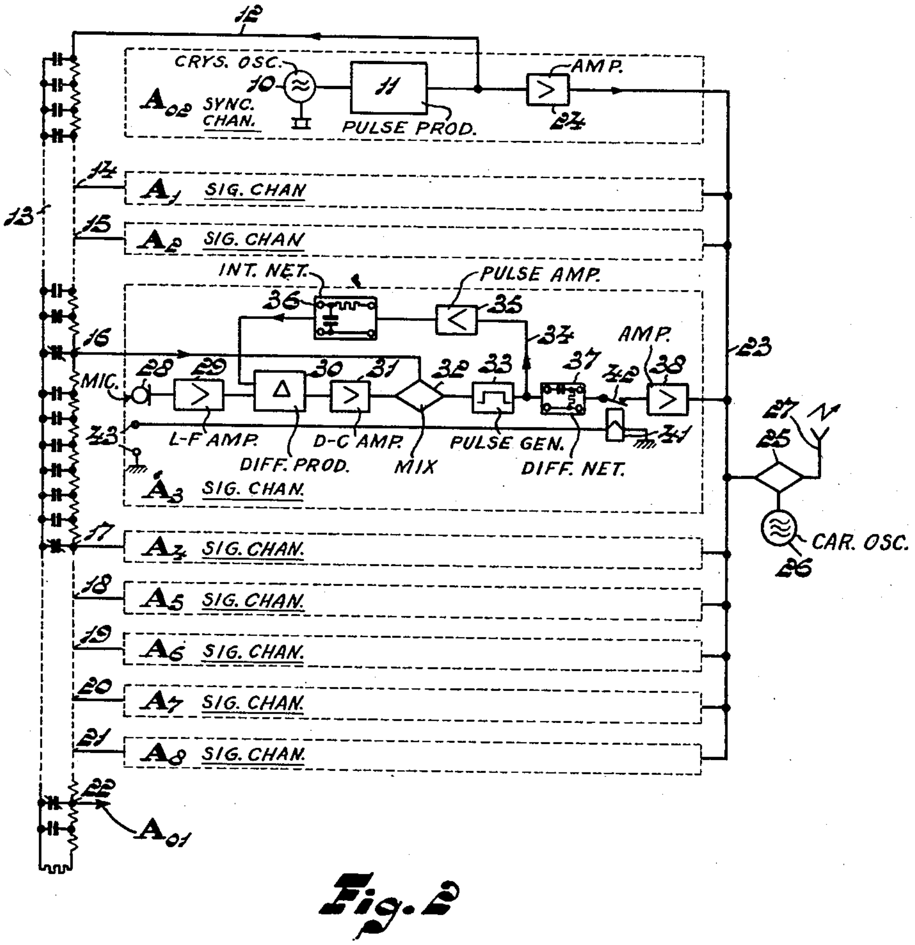
Fig. 2 is a block schematic diagram of one embodiment of a transmitter according to the invention for the transmission of pulse-trains as shown in Fig. 1.

Fig. 2 shows in block diagram form a multiplex transmitter in which the transmitted pulses have the pattern shown in Fig. 1. This transmitter comprises a synchronization channel $A_{02}$ and 8 signal channels from $A_1$ to $A_8$. In view of the signal channels $A_1$ to $A_8$ only the block schematic diagram of channel $A_3$ is shown, the other signal channels being similar and not being indicated in detail for the sake of simplicity.

The synchronization channel $A_{02}$ comprises crystal-controlled oscillator 10 and, connected thereto, a pulse producer 11 which supplies pulses of 1 $\mu$ sec having a repetition frequency of 50 kc./sec. These pulses are fed to a pulse amplifier 24 and, in addition, via a conductor 12, to a time-delay network formed by a time-delay cable 13 which is built up from a large number of LC-sections. Sundry signal channels are connected to successive taps 14 to 21 of this time-delay cable in a manner such that a pulse is supplied to the various signal channels in the time intervals 1 to 8 individually assigned to the channels. In accordance with the signals to be transmitted in the various channels these pulses are transmitted or suppressed by the signal channels. The outlets of the signal channels are all connected in parallel by means of a conductor 23 to which is also connected the output circuit of the pulse amplifier 24 included in the synchronization channel. The pulses absorbed from sundry channels occur in sequence as shown in Fig. 1 and are fed to the further transmitter equipment, which comprises, for example, a modulator 25, a carrier wave oscillator 26 and an aerial 27. At the tap 22 of the time-delay cable 13 pulses occur in the intervals 01 of the cycles but they are not fed to the output conductor 23 so as to avoid transmission of pulses in the intervals 01.

We now proceed with a description of the block schematic diagram of signal channel $A_3$. The signals to be transmitted in this channel are fed to a microphone 28 and via a low frequency amplifier 29 to a difference producer 30, the output voltage of which controls, via a direct current amplifier 31, a mixer 32 to which are also applied the pulses obtained from tap 16 of the time-delay cable 13. The mixer 32 is biased so that pulses obtained from tap 16 are passed only if the output voltage of difference producer 30 has positive polarity. When this difference voltage has negative polarity no pulses occur in the output circuit of mixer 32. The output of mixer 32 is connected to the input circuit of a pulse generator 33 which every time it has a pulse fed to it supplies a greatly widened pulse and then resumes the original condition of equilibrium (one-shot multivibrator). These widened pulses are supplied via a conductor 34 to a return circuit comprising a pulse amplifier 35 and a signal-frequencies integrating network 36. The output voltage of the integrating network is supplied to the difference producer 30. This difference producer supplies a voltage of negative polarity as soon as the instantaneous value of the output voltage of the integrating network 36 exceeds the instantaneous value of the signal voltage; in the opposite case the difference producer 30 supplies a voltage of positive polarity when this output voltage is positive, a pulse obtained from the time-delay cable 13 is passed by mixer 32 to the pulse widener 33, the output pulse of which causes the output voltage of the integrating network 36 to increase by a given quantum. If this rise of the output voltage of the integrating network is not sufficient to cause the polarity of the output voltage of the difference producer to become negative, the output voltage of the integrating network 36 will be further increased upon the entrance of a subsequent pulse from time-delay cable 13 until it has substantially the same value as the signal voltage supplied to the difference producer 30. Consequently, the output voltage of the integrating network 36 essentially follows the signal voltage of amplifier 29, so that the pulses obtained from pulse widener 33 characterize the signal voltage.

The pulses obtained from the said pulse widener 33 are supplied not only to the return circuit 34, 35, 36, 30 but also to a differentiating network 37 which supplies a positive-going output pulse 1 $\mu$ sec upon the application of the leading edge of the widened pulses. The output pulses of differentiating network 37 control a class B amplifier 38, the output circuit of which is connected to the output conductor 23 common to all the channels.

It is obvious from the foregoing that pulses in the channel $A_3$ obtained from tapping point 16 of time-delay cable 13 are passed or suppressed in accordance with the signals required to be transmitted in this channel. The passed pulses occur in the case of a proper choice of the time-lag period of artificial cable 13 between the input and the tap 16 thereof in the time interval 3 assigned to the channel $A_3$. The signal pulses obtained from the other signal channels occur in a similar manner in the intervals associated with them in the cycles.

The pulses obtained from the synchronization channel $A_0$ occur constantly in the interval 02 associated with them, and this is not the case of the signal pulses from the signal channels $A_1$ to $A_8$ in the intervals 1 to 8 associated with them, respectively. If in one of the signal channels the signal pulses occur continuously in the output circuit, this points to a fault of the particular channel and the channel should be disconnected, preferably automatically after say 1 sec. In the interval 01 asosciated with the synchronization interval pulses do not occur at all. If in one of the signal intervals 1 to 8 the signal pulses should be absent continuously, this also points to a fault of the particular channel and the latter should be disconnected after a pause of time of say 0.5 to 1 sec.

For the purpose of signalizing in a signal channel, for example channel $A_3$, the signal pulses may be passed or suppressed for the duration of the signalizing pulses of say 40 to 60 m. sec. The channel $A_3$ is shown to include a signalizing relay 41 having a break contact 42 which, upon the supply of a signalizing pulse to terminal 43, is opened when the relay is energized, thus interrupting the connection between differentiating network 37 and pulse amplifier 38 in channel section $A_3$. This prevents signal pulses being transmitted via channel $A_3$ during the signalizing pulse. Faulty synchronization is not likely to occur provided that simultaneously, by reason of a fault in signal channel $A_4$, pulses do not occur continuously in the output of this channel, before this channel is disconnected. The probability that such pulses may occur and thus may bring about faulty synchronization is, however, negligible in practice.

Instead of signalizing by suppression of signal pulses, signalizing may be effected by passing all the signal pulses in the particular channel section for the duration of the signalizing pulses. Even then faulty synchronization is not likely to occur for similar reasons as mentioned hereinbefore.

Figure 3:
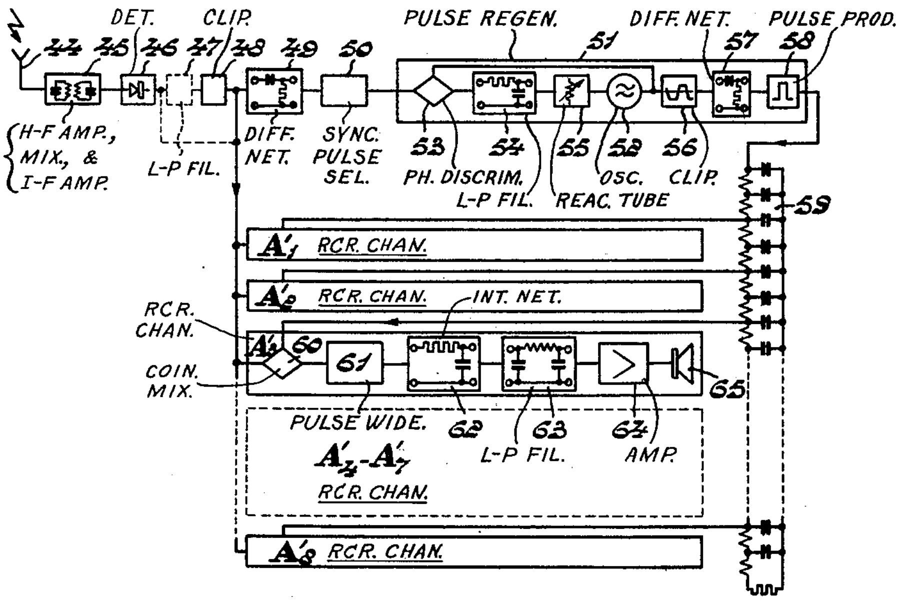
Fig. 3 shows a preferred embodiment of a receiver for use in conjunction with a transmitter of the kind shown in Fig. 2 according to the invention.

We now enter into the details of a description of a receiver according to the invention shown in Fig. 3 for use in cooperation with the transmitter shown in Fig. 2.

In the receiver shown in Fig. 3 the pulse received with the use of an aerial 44 are fed to an amplifier stage 45 which comprises, for example, in succession a high frequency amplifier 45, a mixer and an intermediate frequency amplifier.

In accordance with the invention, the band width of the intermediate frequency amplifier is preferably smaller than double the maximum repetition frequency, in the particular case 500 kc./sec. The width of the intermediate frequency amplifier may therefore be, for example, from 0.6 to 0.9 mc./sec. By reason of the said restriction of the bandwidth of the intermediate frequency amplifier, the pulses obtained from a detector 46 connected thereto will have the pattern shown in Fig. 1*b*. In Fig. 1*b* the synchronization pulses are shaded, but pulses in immediate sequence are no longer separately recognizable. By reason of the said bandwidth restriction, pulses in immediate sequence, for example the pulses from the intervals 02, 1 and 2 in the cycle $T_1$, merge into a single pulse having a slowing ascending leading edge and also a slowly descending trailing edge.

The pulses obtained from detector 46 are fed, if desired, via a low-pass filter 47, to an amplitude limiting and threshold device 48 (clipper) which, according as the voltage in the diagram shown in Fig. 1*b* is higher or is lower than a threshold value $V_s$ indicated therein, supplies a high or a low output voltage. The pulses obtained from the two-sided limiter 48 are thus provided with the pattern shown in Figure 1*c*. As may be seen from this figure, the individual pulses now have a width which corresponds to a signal interval. If the bandwidth of the intermediate-frequency amplifier 45 were large enough for pulses in immediate sequence in the output detector 46 not to merge into a single pulse, the detector 46 must be followed by a low-pass filter 47 the cut-off frequency of which is less than the maximum repetition frequency of the output pulses and in the case assumed may be, for example, from 0.6 to 0.9 mc./sec. In this case, pulses of the nature depicted in Fig. 1*b* only finally occur in the output circuit of the low-pass filter 47. The output voltage of the limiter 48 is thus not subject to alteration.

The substantially rectangular pulses obtained from the limiter 48 are fed to a differentiating network 49 in whose output circuit pulses depicted in Fig. 1*d* occur. These pulses obtained by differentiation control a synchronization pulse selector 50 which is only sensitive to the positive-going pulses shown in Fig. 1*d*.

The function of the synchronization pulse selector 50 is to supply a pulse in each synchronization interval under control of the pulses received and to suppress the other pulses. Suitable detailed construction of a selector to be used for this purpose will be described more fully with reference to Fig. 4. It is sufficient to point out here that by reason of the widening of the received pulses to a duration corresponding to the signal intervals and the then following differentiation, fewer pulses are supplied to the selector 50 than there were individual pulses transmitted. In the period of time shown in Fig. 1, 19 pulses were transmitted, as may be seen from Fig. 1*a*, whereas only 11 positive pulses occur in the output circuit of the differentiating network 49. Only if the pulses emitted by the transmitter were alternately present and absent, would as many positive pulses be supplied to the selector 50 as there were pulses transmitted. In all other cases fewer positive pulses are supplied to the selector 50 than there were pulses transmitted. This decrease of the number of the pulses supplied to the synchronization pulse selector enables a synchoronization interval to be found more quickly than hitherto was rendered possible by systems of the present kind, as will be seen more clearly from the description of the construction of the selector 50 shown in Fig. 4. The output pulses of selector 50 are depicted in Fig. 1*e*.

In the foregoing the received pulses (see Fig. 1*b*) were tacitly assumed to have the same regular pattern as the transmitted pulses shown in Fig. 1*a*. However, in practice, this is not the case due to faults in the transmission path, as the received pulses exhibit relative discrepancies in amplitude, shape and duration and the relative spacing between the pulses has been subjected to alteration. At the receiver end, the pulses depicted in Fig. 1*b* will, in addition, exceed the threshold value $V_s$ shown in this figure not at the instants indicated, which are exactly coincident with the starting instants of the intervals, but at instants fluctuating thereabout. These shifts of the pulse edges would give rise at the receiver end to a certain noise in the received signal, which noise may, however, be eliminated in practice by particular precautions. Normally, in the transmission of pulses, leading edges are found to promote less "noise" than trailing edges and, for this reason, the synchronization pulse is transmitted preferably in the latter half (02) of the synchronization interval, so that at the receiver end pulses coincident with its leading edge are obtained, said pulses being located at such a time distance from the preceding signal interval that extension of the trailing edges of the signal pulses concerned is not liable to give rise to cross-talk.

For the purpose of noise-suppression, the synchronization pulses obtained from the synchronization pulse selector 50 are fed to a pulse regenerator or noise-suppressing device 51 which is shown in Fig. 3 in block diagram form only. For a detailed construction, reference may be had to the aforementioned U. S. Patent No. 2,662,118. The noise suppressing device comprises an oscillator 52 which supplies oscillations at a frequency which is substantially similar to the repetition frequency of the synchronization pulses received. The oscillation from the oscillator 52 are supplied, together with the synchronization pulses set up at the output of the synchronization pulse selector 50, to a phase discriminator constituted by a mixer 53. In the output circuit of this mixer a direct control voltage component is produced which depends on the phase of the synchronization pulses in relation to the sinusoidal voltage. After filtering by low-pass filter 54, this direct control voltage controls a reactance tube 55 coupled to the frequency-determining circuit of the oscillator 52. The frequency of the local oscillator 52 is thus kept automatically equal to the mean repetition frequency of the synchronization pulses. Whereas the synchronization pulses fed to the regenerator 51 exhibit phase fluctuations, these phase fluctuations will occur in the sinusoidal output voltage of oscillator 52 to a greatly reduced extent or not occur therein at all, provided the time constant of the filter 54 is high enough for the cut-off frequency to be, for example, from 1/100 to 1/500 of the repetition frequency of the synchronization pulses. The oscillations of oscillator 52, which thus are comparatively stable in phase, are fed via an amplitude limiting- and threshold device 56 (clipper) to a differentiating network 57. The negative pulses obtained therefrom excite a pulse producer 58 which supplies positive output pulses at a repetition frequency which is exactly similar to the mean repetition frequency of the received synchronization pulses, the mean value being taken, for example, from 100 to 500 cycles, and which, in contradistinction to the latter pulses, no longer have a time-shift noise.

The pulses so obtained are substituted for the received signal pulses and are distributed about the individual receiver channels, which in the figure are designated $A_1'$ to $A_8'$. Only the channel $A_3'$ is shown in block diagram form. The pulses fed to channel $A_3'$ via time-delay cable 59 have such a time-lag in relation to the pulses deprived of noise depicted in Fig. 1*e* that they occur in the intervals associated with the third signal channel, as may be seen from Fig. 1*f*, in which these pulses are shaded.

These delayed pulses are utilized to replace the received pulses, which, as set out hereinbefore, may exhibit certain time shifts. The received pulses which occur in the output circuit of limiter 48 are supplied in parallel connection to coincide mixers (see 60 in channel $A_3'$) in signal channels $A_1'$ to $A_8'$. Fig. 1*f* shows all the pulses supplied to the mixer 60, that is to say, the pulses depicted in Fig. 1*c* together with the pulses deprived of noise and obtained from time-delay cable 59. The coincidence mixer 60 only supplies output pulses if pulses obtained from time-delay cable 59 are coincident with pulses obtained from the limiter 46. This is denoted in Fig. 1*f*. Threshold value $V_c$ must be exceeded in order to produce an output pulse. The output pulses of coincidence mixer 60 are depicted in Fig. 1*g*, it being noted that output pulses do not occur in the cycles $T_1$ and $T_4$, so that the pulses concerned are shown as broken lines in a manner similar to that used in Fig. 1*a*. The signal pulses deprived of noise and obtained from mixer 60 are fed via a pulse widener 61 to a signal-frequencies integrating network 62 to recover the transmitted signal. The latter is supplied to a loudspeaker 65 via a low-pass filter 63 and an amplifier 64 to withdraw from it the pulse-repeating frequency and higher harmonics still occurring therein.

In the construction of the receiver as described with reference to Fig. 3, the received pulses supplied in parallel connection to the coincidence mixers of the individual signal channels $A_1'$ to $A_8'$ are obtained from the limiter 48. It is not essential to feed the received pulses to the input mixers of the individual channels after their widening to a duration corresponding to the signal intervals. The pulses fed to the individual channels instead of the limiter 48 may thus be derived from the output circuit of detector 46, even if the high and intermediate frequency amplifier 45 is proportioned so amply in relation to the bandwidth that pulses of immediate sequence in the output circuit of the detector 46 do not merge into a single pulse.

Figure 4:
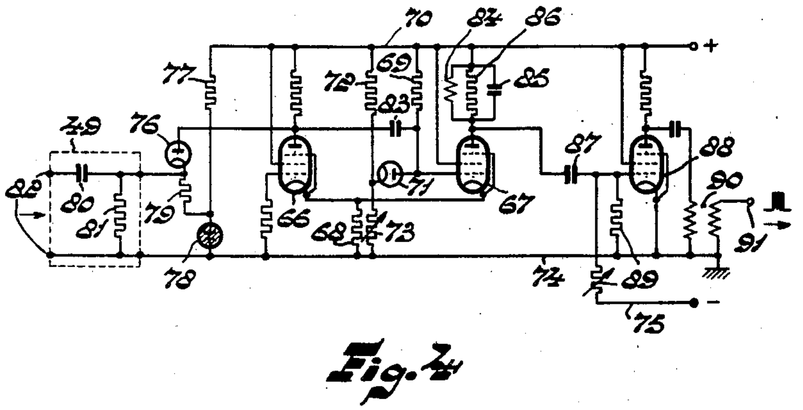
Fig. 4 shows a synchronization pulse selector for use in the receiver shown in Fig. 1.

Referring now to the details of the diagram, depicted in Fig. 4, illustrating a preferred construction of the synchronization pulse selector shown in Fig. 3, it is assumed that the selector has supplied to it negative pulses corresponding to the positive pulses depicted in Fig. 1*d*.

The selector shown in Fig. 4 comprises two pentodes 66 and 67 which cut off one another and which have a common cathode resistor 68. The control grid of pentode 66 is connected to the end of cathode resistor 68 remote from the cathode and is consequently at a high negative bias voltage. The control grid of pentode 67 is connected on the one hand via a grid resistor 69 to the anode voltage lead 70 and on the other hand to the anode of a diode 71, the cathode of which is connected to a variable potentiometer comprising resistors 72 and 73 which are connected between ground conductor 74 and the anode voltage lead. In the circuit described, the control grid of pentode 67 is at a potential which substantially corresponds to the potential of the cathode of the pentode 67. Since, in view of the pentodes 66 and 67 cutting off one another, the control grid of the pentode 66 has a high negative bias voltage, current will normally be passed by the pentode 67 and the pentode 66 will be cut off. In this condition of the circuit the anode of pentode 66 is at a high positive potential with the result that a diode 76 which is connected thereto, the cathode of which is kept at the suitable positive potential by the use of a potentiometer comprising a resistor 77 and a low discharge tube 78, is conductive. The cathode of diode 76 is connected via a resistor 79 to the tap of the potentiometer 77, 78 connected in parallel with the anode-voltage source, at a potential of about 150 volts. The cathode of diode 76 is also connected to an output terminal of differentiating network 49 (see also Fig. 3), which is constituted by a capacitor 80 and a resistor 81. As shown in Fig. 3, the input terminals 82 of this differentiating network are connected to the output circuit of the limiter 48.

Set up across the output resistor 81 of the differentiating network 49 are the positive pulses depicted in Fig. 1*d*, but with negative polarity. Under the condition described in the circuit in Fig. 4, pulses of negative polarity supplied to the cathode of diode 76 will be fed, via diode 76 and a coupling capacitor 83 interconnected between the anode of pentode 66 and the control grid of pentode 67, to the control grid of pentode 67, with the result that the pentode 67 is cut off and pentode 66 is rendered conductive. Owing to the pentode 66 becoming conductive, its anode is at such a low positive potential that the diode 76 connected to this anode is cut off and any further pulses supplied to the input terminal are prevented from acting on the pentodes 66 and 67, which are coupled cross-wise. The diode 76 consequently forms part of a gating circuit.

After a period which depends on the time constant of the trigger circuit which comprises pentodes 66 and 67, the circuit will flop back into its original condition in which pentode 67 is conductive and pentode 66 is cut off. Upon this flopping back into the original state of equilibrium the diode 76 is also again released so that a subsequent received pulse causes the trigger circuit to respond again. The time constant of the trigger circuit is such that after responding to a pulse it remains insensitive for a period of time which is smaller than a signal cycle, for example, $T_1$, and larger than a signal cycle minus a signal interval. If the synchronization pulse selector were excited in the signal interval $T_1$ of Fig. 1, for example, by a pulse in the interval 6, it will remain insensitive as far as immediately before the occurrence of a pulse in the time interval 6 in signal cycle $T_2$. However, in the signal cycle $T_2$ no pulse occurs within the time interval 6 in the output circuit of the differentiating network 49 with the result that he response of the selector does not ensue until in the signal cycle $T_3$ in the interval 0, which is the synchronization interval. After this latter response the selector remains insensitive as far as in the interval 01 in signal cycle $T_4$, whereupon it again responds to the synchronization pulse, which is always present. The selector circuit described consequently has the feature of automatically finding the synchronization interval and then responding in every synchronization interval. Upon any response of the selector, pentode 67 is cut off and this sets up a voltage pulse in its anode circuit, thus exciting a tuned circuit lying therein and including a coil 84, a capacitor 85 and a damping resistor 86. This tuned circuit then sets up, via coupling capacitor 87, a positive voltage pulse, the duration of which is determined by the natural frequency of the tuned circuit 84, 85, across the control grid of a pentode amplifier 88 which is normally cut off by a negative grid-bias obtained from a potentiometer 89. The voltage pulses occurring in the anode circuit of pentode 88 are fed via an output transformer 90 to an output terminal 91 of the synchronization pulse selector.

The foregoing shows that the selector, if it responds in the interval 6 of the cycle $T_1$, does not respond in cycle $T_2$ in the subsequent cycle by reason of the pulse widening used and the subsequent differentiation. However, without pulse widening the selector would again respond in cycle $T_2$ in the interval 6 in cycle $T_2$ and this would also be the case in cycle $T_3$. The use of the invention has therefore the effect of notably expediting the finding of the synchronization interval.

After the foregoing it will be obvious without any further comment that the invention can also be employed if per signal channel the signals are characterized by the use of a multi-unit code instead of a one-unit code, for example, in the manner described in the afore-mentioned prior Specification 75,663 and, in this case, the distribution device in the receiver must naturally be altered to conform therewith. However, the manner of transmitting synchronization pulses and their selection at the receiver end can be maintained without any alteration.

What I claim is:

1. In a multiplex pulse code modulation communication system for transmitting intelligence signals, a transmitter comprising pulse code modulating means to generate periodic code cycles, each cycle being constituted by sequential signal intervals within which pulses are present and absent in an alternation depending upon the applied intelligence signals and by a synchronization interval having a duration corresponding to two of said signal intervals, a selected half of said synchronization interval having a first synchronization impulse therein, and means for transmitting said periodic code cycles containing said first synchronizing impulses as a modulation component on a carrier wave; and a receiver comprising means to detect the transmitted carrier wave to derive therefrom said code cycles, code demodulation means responsive to said received code cycles to produce the desired intelligence signal, a differentiating network, a synchronizing pulse selector, means to apply said received code cycles through said differentiating network to said selector, said selector producing within the synchronizing interval of each of said received code cycles a second synchronizing impulse, and means to apply said second synchronizing impulse to said code demodulation means to maintain synchronism between the code demodulation means in the receiver and the code modulation means in the transmitter.

2. A multiplex pulse code modulation communication system for transmitting and receiving intelligence signals, comprising a transmitter and a receiver, said transmitter comprising means for producing periodic code cycles each of which includes a predetermined number of sequential signal intervals having equal time durations and within which pulses are present and absent in an alternation depending upon said intelligence signals, means for producing a synchronization interval in each of said periodic code cycles, means for producing a synchronizing pulse in only a selected half portion of said synchronization interval, said half portion having a time duration corresponding to that of one of said sequential signal intervals, a source of a carrier wave, means for modulating said carrier wave with said code cycles, and means for transmitting the modulated carrier wave to said receiver, said receiver comprising means to detect the transmitted carrier wave to derive therefrom said code cycles, code demodulation means responsive to said received code cycles to produce the desired intelligence signal, a differentiating network, a synchronising pulse selector, means to apply said received code cycles through said differentiating network to said selector, said selector comprising means for producing in the selected half of the synchronising interval of said received code cycles a second synchronising impulse, and means to apply said second synchronising impulse to said code demodulation means.

3. A receiver as set forth in claim 2 wherein said detecting means includes a first low-pass filter having a cut-off frequency not exceeding said predetermined maximum pulse frequency.

4. A receiver as set forth in claim 3 wherein said detecting means includes an intermediate frequency amplifier having a bandwidth which is less than twice said predetermined maximum pulse frequency.

5. A receiver as set forth in claim 3 wherein said detecting means includes a second low-pass filter having a cut-off frequency which is smaller than said predetermined maximum pulse frequency.

6. A multiplex pulse code modulation communication system for transmitting and receiving intelligence signals, comprising a transmitter and a receiver, said transmitter comprising means for producing periodic code cycles each of which includes a predetermined number of sequential signal intervals having equal time durations and within which pulses are present and absent in an alternation depending upon said intelligence signals, means for producing a synchronization interval in each of said periodic code cycles, means for producing a synchronizing pulse in only a selected half portion of said synchronization interval, said half portion having a time duration corresponding to that of one of said sequential signal intervals, a source of a carrier wave, means for modulating said carrier wave with said code cycles, and means for transmitting the modulated carrier waves to said receiver, said receiver comprising means to detect the transmitted carrier wave to derive therefrom said code cycles, code demodulation means responsive to said received code cycles to produce the desired intelligence signal, a differentiating network responsive to said received code cycles to derive pulsed signals therefrom, a synchronising pulse selector coupled to said differentiating network to receive said pulsed signals and comprising means for producing an output pulse in response to an input pulse, means for rendering said pulse selector temporarily insensitive after receiving an input pulse for a period having a duration less than that of a code cycle and greater than that of a code cycle minus a signal interval, whereby said pulse selector has the characteristic of producing a second synchronizing impulse in response to every synchronizing pulse which occurs in said selected half of the synchronizing interval, and means to apply said second synchronising impulse to said code demodulation means.

7. A receiver as set forth in claim 6 wherein said synchronising selector includes in serial connection a gating device and a multivibrator, said multivibrator having two electron discharge tubes with control and output electrodes therefor, said tubes having an intercoupling characteristic at which either tube may be rendered non-conductive through feedback of voltage developed across the other tube.

8. A receiver as set forth in claim 7 wherein the gating device includes a diode having an anode and cathode therefor, said anode being connected to the output electrode of one of said electron discharge tubes, said cathode being connected to a point of adjustable direct potential and also being connected to a capacitance responsive to said pulsed signals.

References Cited in the file of this patent

UNITED STATES PATENTS

| | | |
|---|---|---|
| 2,471,138 | Bartelink | May 24, 1949 |
| 2,493,353 | Kuperus | Jan. 3, 1950 |
| 2,541,076 | Labin et al. | Feb. 13, 1951 |
| 2,549,422 | Carbrey | Apr. 17, 1951 |
| 2,610,295 | Carbrey | Sept. 9, 1952 |